E. C. BURROUGHS.
HAND PROTECTOR FOR STEERING WHEELS.
APPLICATION FILED FEB. 23, 1917.
1,235,549.
Patented Aug. 7, 1917.
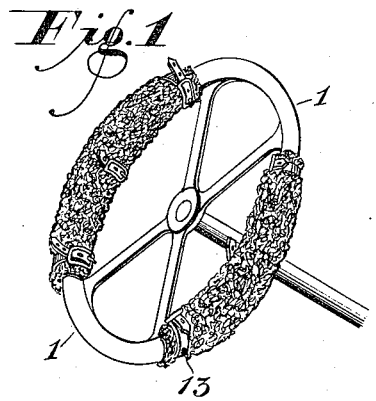
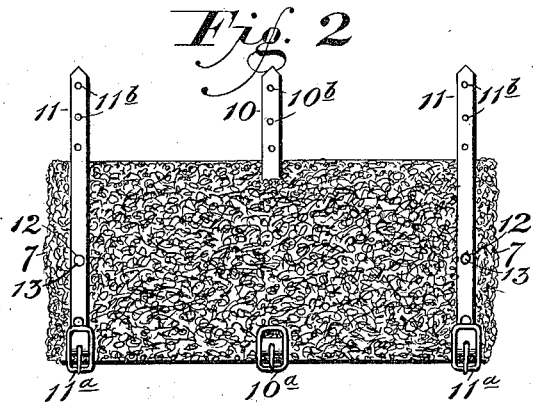
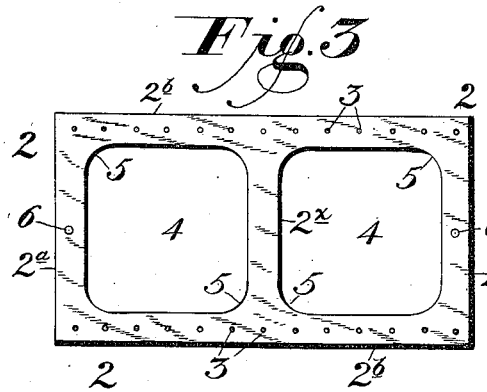
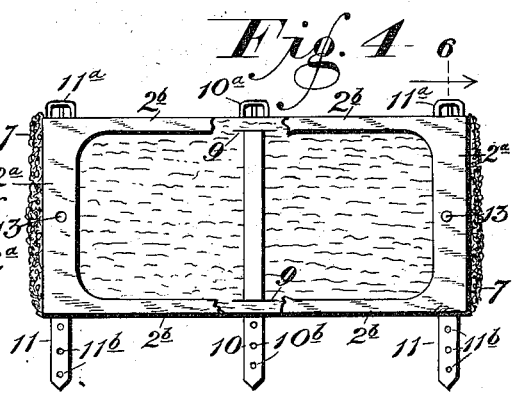
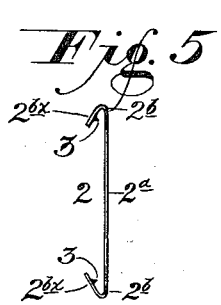
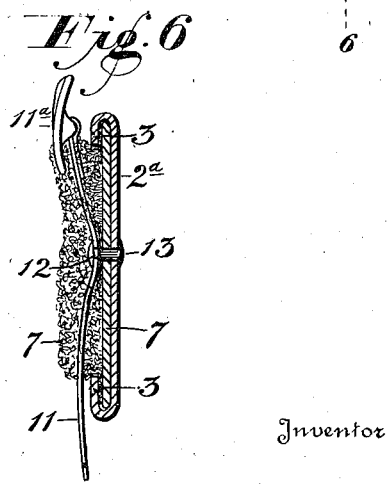
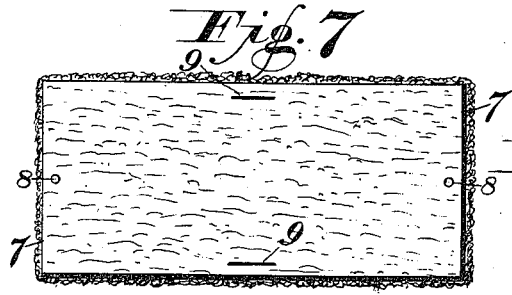
Inventor
Elmer C. Burroughs
By E. E. Overholt
Attorney

UNITED STATES PATENT OFFICE.

ELMER CLARENCE BURROUGHS, OF BASIN, WYOMING.

HAND-PROTECTOR FOR STEERING-WHEELS.

1,235,549.  Specification of Letters Patent.  Patented Aug. 7, 1917.

Application filed February 23, 1917. Serial No. 150,483.

*To all whom it may concern:*

Be it known that I, ELMER CLARENCE BURROUGHS, a citizen of the United States, residing at Basin, in the county of Big Horn and State of Wyoming, have invented certain new and useful Improvements in Hand-Protectors for Steering-Wheels, of which the following is a specification.

My invention relates to accessories for machines which are guided by steering wheels, (such for instance as automobiles, flying machines, etc.), and more particularly to a non-heat-conducting pad for the steering wheels of these machines.
My object is to provide a device of this character which can be easily attached to a steering wheel, and which will greatly lessen the tendency of the wheel to chill the hands of the driver in severe weather.
Another object is to provide a device of this character which will not slip nor creep on the wheel, nor otherwise yield to the working strain imposed upon it by the hand of the operator, but which will maintain a rigidity upon the wheel that will leave it practically as responsive to the impulses from the hand of the driver as when the pad is not used.

A further object is to provide a device of this character which while firmly held against movement upon the wheel, as above set forth, will yet be soft and agreeable to the hand of the driver, and will operate as a shock-absorber to relieve his hands and arms from the continuous strain which would otherwise be imposed upon them by the constant jarring and bumping of the machine.

Minor objects will appear in the subjoined description.

The embodiment of the invention illustrated in the drawings and herein specifically described, may be briefly described as a soft pad, (formed preferably of tanned sheep skin with the wool left on), mounted on a suitable bendable frame with the woolly side of the sheep skin turned outwardly; the pad and frame being secured together, and provided with means for adjustably securing the device upon a steering wheel.

The invention consists in the novel construction and arrangement of the parts relatively to each other, as will be hereinafter described and claimed, reference being had 5 to the accompanying drawings, in which:—

Figure 1 is a perspective view of a steering wheel provided with my device.

Fig. 2 is a plan view of the outside of the device before it is bent to conform to the 6 shape of the wheel with which it is to be used.

Fig. 3 is a plan view of the metallic frame of the device before the opposite side edges thereof have received their initial bend preparatory to being further bent into clamping engagement with the opposite side edges of the non-conducting pad.

Fig. 4 is a plan view of the reverse side of Fig. 2, with the central part of the metallic frame broken away to more clearly show the method of attaching the central billet to the device.

Fig. 5 is an end elevation of the metallic frame showing its opposite side edges provided with their initial bends preparatory to receiving the edges of the non-conducting pad.

Fig. 6 is a sectional view taken on the line 6—6 of Fig. 4 looking in the direction of the arrow; the section being on a somewhat enlarged scale, with the thickness of the metallic plate and sheep-skin exaggerated, to show more clearly how these two parts and a billet are secured together at each end of the device by a single rivet; and, Fig. 7 is a plan view of the flesh side of the sheepskin pad shown in the drawings.

Referring further to the drawings, the numeral 1 indicates a steering wheel provided with two of my hand protectors, one for each hand of the driver.

The frame 2 of the device is formed from a piece of sheet metal provided on its opposite side edges with small pointed indentations 3, and having its central portion cut away at intervals, to form the openings or cut-away portions 4 which are preferably rounded at their corners 5; while the end sections $2^a$ of the frame are provided with openings 6. The frame as thus formed, consists of the two parallel side sections $2^b$ connected together by the end sections $2^a$ and the central section $2^x$, said central and end sections being parallel with each other and extending at right angles to the side sections $2^b$.

The non-conducting pad 7 which forms the outer portion of my device may be formed of any suitable non-heat-conducting material, but I have here shown it as formed of a piece of tanned sheep-skin with the wool left on. This piece of sheep-skin is practically the same length as the frame 2 but is slightly narrower, and is provided at its ends with the holes 8 (corresponding to the holes 6 in the plate 2), and near its side edges with the longitudinal slits 9 which are adapted to receive the central billet 10.

In addition to the billet 10, the device is provided with two end billets 11.

For adjusting purposes these billets are provided at one end with the buckles 10ª and 11ª respectively, and at the other with the holes 10ᵇ and 11ᵇ respectively.

The end billets 11 are also provided between their buckles and perforated end portions with the rivet openings 12 for securing these end billets to the device.

When the parts forming my device are ready to be assembled, the opposite side edges of the frame 2 are bent toward each other as indicated in Fig. 5, with the small pointed indentations 3 extending inwardly. Next, the billet 10 is passed through the slits 9 of the sheep-skin pad, to secure the billet on the pad, as illustrated in Fig. 4, with the main portion of the billet on the flesh side of the pad and its ends projecting through the slits 9 to the woolly side thereof. The sheep-skin pad is then placed on the frame between the inwardly inclined edge sections 2ᵇˣ of the sides 2ᵇ thereof, with the flesh side of the sheep-skin next the frame, and with the holes 8 of the sheepskin in registration with the holes 6 of the frame: The pad is then pressed into flat engagement with the frame to force its side edges well under the sharp projections 3. The inclined sections 2ᵇˣ of the sides 2ᵇ of the frame are then forced down into clamping engagement with the edges of the sheepskin, and the two are thus very firmly held together, not only by reason of the clamping action of the edge sections 2ᵇˣ of the sides of the frame, but also by reason of the pointed projections 3 carried by said sections being now pressed into the sheepskin. Next, the end billets 11 are placed in position on the device as illustrated in Figs. 2, 4, and 6; and the rivets 13 (see Fig. 6) are passed through the openings 12 of the billets and the registering openings 6 and 8 of the frame and pad respectively. The inner end of the rivet is then battered to secure the parts together through which it has passed. The device is then ready to be bent around the rim of the steering wheel and secured thereon by the billets as shown in Fig. 1.

When it is desirable to leave the device on the steering wheel for long periods of time, the frame may be formed of metal which can be bent but which has little or no resiliency. On the other hand, in cases where it is found necessary to put the device on the steering wheel and take it off very frequently, the frame may be made of very springy resilient material, which, (while readily responding to the drawing of the billets when they are buckled up) will also cause the device to open immediately out of engagement with the rim of the wheel when the billets are unbuckled, so that it will drop off the wheel of itself.

For ordinary uses tin plate will serve very well for making the frame.

The openings 4 of the frame not only serve the purpose of weakening the metal sufficiently to permit it to bend with reasonable facility, but also serve the very useful and necessary purpose of causing the frame (which is made of flat material) to fit the curved rim of the steering wheel. Rounding the corners 5 of the openings 4 tends to prevent abrupt bends in the plate when it is bent into conformity with the rim of the steering wheel.

The central billet 10 having its main portion immediately in contact with the central section 2ˣ of the frame causes the billet to hold that section of the frame in very rigid engagement with the wheel, while at the same time preventing the billet from being exposed on the outside of the pad to the hand of the driver. This arrangement also protects the central billet, in large measure, from dampness in wet weather, which would have a tendency to cause the billet to stretch.

Having the central portion of the frame held firmly in engagement with the steering wheel, prevents the frame from having any tendency to longitudinal buckling, and thus adds greatly to its rigidity on the wheel.

From the arrangement shown it will be seen that my device is admirably adapted to neatly fit a steering wheel, and that even though it is made of comparatively light material, it will yet be held with great rigidity and firmness on the wheel, and will thus not practically lessen the responsiveness of the wheel to the impulses imparted thereto from the hand of the operator.

Having now described the principles of my invention and shown a practical embodiment of the same, what I claim as new and desire to secure by Letters Patent is:—

1. A device of the character described, comprising a pad, and a frame adapted to hold the pad in position on a steering wheel; means for securing the frame and pad together; and means for holding said united parts upon a steering wheel.

2. A device of the character described, comprising a pad of non-heat-conducting material; and a metallic frame adapted to hold the pad in position on a steering wheel;

means for securing said parts together; and means for holding said united parts upon a steering wheel.

3. A device of the character described, comprising a pad of non-heat-conducting material; and a metallic frame having longitudinally extending side sections connected together by transverse sections; means for securing the pad and frame together; and adjustable means for holding said united parts upon a steering wheel.

4. A device of the character described, comprising a pad of non-heat-conducting material; a frame formed of sheet metal having cut-away portions between its sides and ends; a series of indentations at each side of the device near its edge; said pad being slightly narrower than said frame and disposed in flat engagement therewith, and said side portions containing said indentations being bent toward each other into clamping engagement with the edges of the pad, and with said indentations biting into the pad to securely hold the pad and frame together; and adjustable means for securing the device upon a steering wheel.

5. A device of the character described, comprising a pad of non-heat-conducting material; a frame formed of sheet metal having cut-away portions between its sides and ends, said frame being somewhat wider than the pad and disposed in flat engagement therewith, and having its projecting side portions bent toward each other and into clamping engagement with the sides of the pad to secure the pad and frame together; and means for removably securing said united parts upon a steering wheel.

6. A device of the character described, comprising a pad having slits near its sides; a frame formed of sheet metal and having cut-away portions between its sides and ends, said frame being disposed in flat engagement with the pad; and means for securing said parts together and holding them on a steering wheel, said means including a billet disposed between the frame and pad with its ends projecting through said slits in the pad to the outer side thereof, the projecting ends of said billet being adapted for engagement with each other.

ELMER CLARENCE BURROUGHS.